(12) United States Patent  (10) Patent No.: US 7,558,590 B2
Baudino et al.  (45) Date of Patent: Jul. 7, 2009

(54) METHOD AND SYSTEM FOR MULTIPARTY CALLING USING A DUAL MODE PHONE WITH PRIVATE CALL

(75) Inventors: Daniel A. Baudino, Lake Worth, FL (US); Deepak P. Ahya, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 568 days.

(21) Appl. No.: 11/286,568

(22) Filed: Nov. 25, 2005

(65) Prior Publication Data

US 2007/0123285 A1    May 31, 2007

(51) Int. Cl.
H04Q 7/20 (2006.01)
(52) U.S. Cl. .................. 455/518; 455/517; 455/519; 455/416; 455/422.1; 455/466; 370/310; 370/328; 370/312; 379/207.01; 379/201.01; 379/204.01; 379/206.01
(58) Field of Classification Search .................. 455/518, 455/519, 500, 501, 466, 422.1, 426.1, 426.2, 455/552.1, 553.1, 550.1, 432.1, 435.1, 403, 455/416, 414.1, 463; 370/310, 312, 328, 370/340; 379/207.01, 201.01, 204.01, 206.01
See application file for complete search history.

(56) References Cited

U.S. PATENT DOCUMENTS

| | | |
|---|---|---|
| 4,989,230 A | 1/1991 | Gillig et al. |
| 5,127,042 A | 6/1992 | Gillig et al. |
| 5,260,988 A | 11/1993 | Schellinger et al. |
| 5,265,262 A | 11/1993 | Grube et al. |
| 5,301,353 A | 4/1994 | Borras et al. |
| 5,367,558 A | 11/1994 | Gillig et al. |
| 5,442,680 A | 8/1995 | Schellinger et al. |
| 5,463,674 A | 10/1995 | Gillig et al. |
| 5,842,122 A | 11/1998 | Schellinger et al. |
| 5,901,357 A | 5/1999 | D'Avello et al. |
| 6,014,376 A | 1/2000 | Abreu et al. |
| 6,141,560 A | 10/2000 | Gillig et al. |
| 6,351,652 B1 * | 2/2002 | Finn et al. ................. 455/552.1 |
| 6,363,246 B1 | 3/2002 | Williams et al. |
| 7,289,816 B2 * | 10/2007 | Mills ........................... 455/458 |
| 2004/0190468 A1 * | 9/2004 | Saijonmaa ................... 370/312 |
| 2005/0164682 A1 | 7/2005 | Jenkins et al. |
| 2006/0063561 A1 * | 3/2006 | Bui ........................ 455/552.1 |
| 2008/0090605 A1 * | 4/2008 | Park et al. ................ 455/552.1 |

* cited by examiner

*Primary Examiner*—Keith T Ferguson
(74) *Attorney, Agent, or Firm*—Akerman Senterfitt; Pablo Meles

(57) ABSTRACT

A method (100) and system (20) for multiparty communication using at least one dual mode communication device includes a dual mode radio (11) having at least a first modem (12) for operation on a first network and a second modem (13) for operation on a second network and a processor (55) coupled to the radio. The dual mode radio can be programmed to establish (102) an interconnect call on a first network between the dual mode radio and a second communication device, receive (104) a request for a private call on a second network from a third communication device, and mix and route (106) audio from the private call and the interconnect call at the dual mode radio when a multiparty call mode is selectively chosen. The dual mode radio can be a first modem operating on a CDMA network and a second modem operating on an iDEN network.

17 Claims, 4 Drawing Sheets

FIG. 3
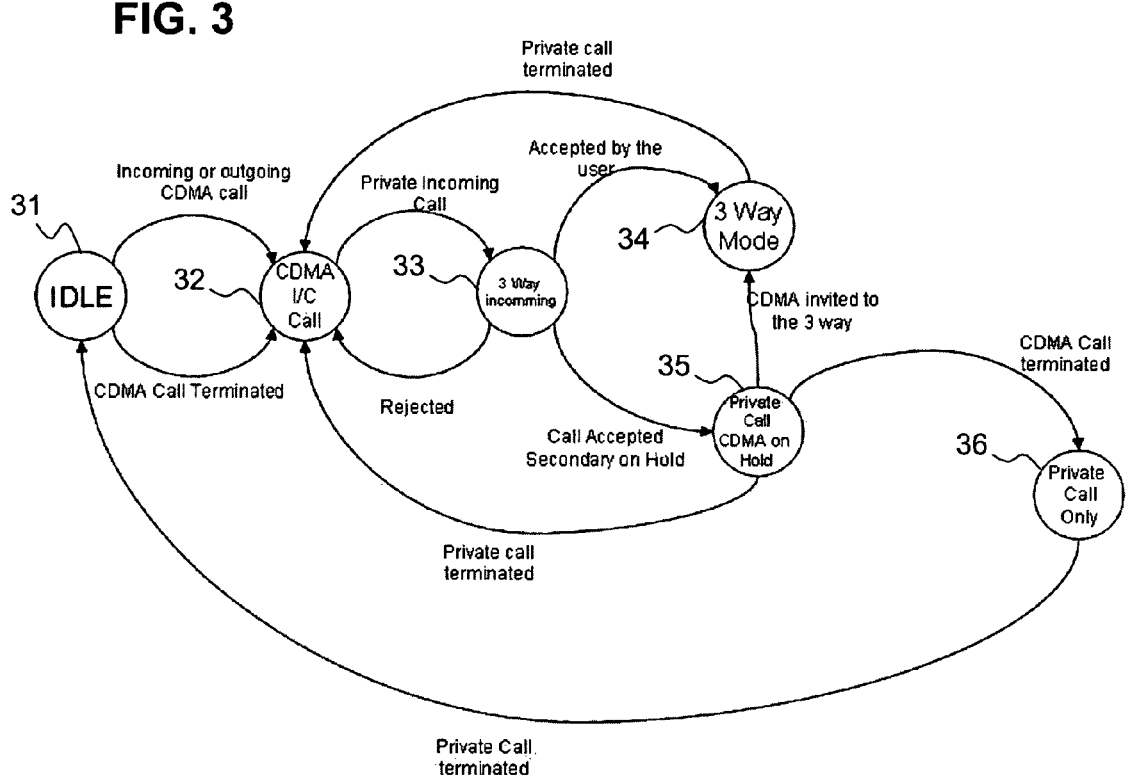
FIG. 4  3 Way Call Mode with Private call
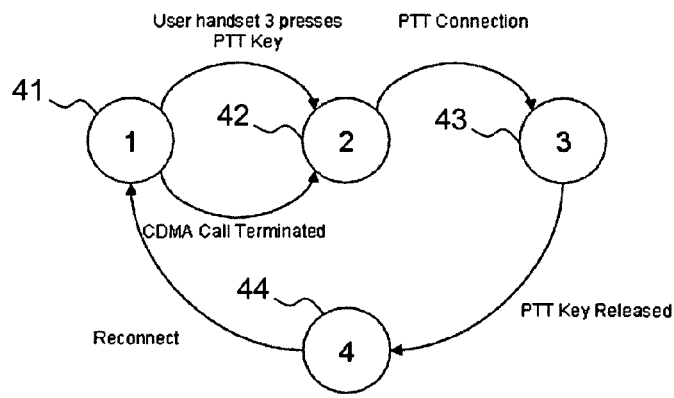

METHOD AND SYSTEM FOR MULTIPARTY CALLING USING A DUAL MODE PHONE WITH PRIVATE CALL

FIELD OF THE INVENTION

This invention relates generally to multiparty calls, and more particularly to a method and system for multiparty calls using a dual mode phone with private call features.

BACKGROUND OF THE INVENTION

While on an interconnect call on an iDEN handset, any incoming push-to-talk (PTT) or private call cannot be completed since current technology does not allow PTT while on an interconnect call. Even on existing dual mode phones, integration between private or PTT calls on one network with interconnect calls on another network fails to exist to form a multiparty call.

SUMMARY OF THE INVENTION

Embodiments in accordance with the present invention can enable users of dual mode phones having both private (or PTT) call capabilities and interconnect call capabilities to create a three-way or multiparty call on different communication networks.

In a first embodiment of the present invention, a method for multi-party communication for push-to-talk on a dual mode communication device can include the steps of establishing an interconnect call on a first network between the dual mode communication device and a second communication device, receiving a request for a private call on a second network from a third communication device, and mixing and routing audio from the private call and the interconnect call at the dual mode communication device when a multiparty call mode is selectively chosen. The dual mode communication device can have a first modem operating on the first network and a second modem operating on the second network and the method further includes the step of mixing a microphone input at the dual mode communication device with audio generated from the interconnect call on the first network and routing a mixed signal to the second modem. The method can then transmit the mixed signal from the second modem to at least the third communication device on the second network. The method can further include mixing incoming voice received over the air from the first modem with incoming voice received over the air from the second modem to form a mixed received signal and routing the mixed received signal to a speaker at the dual mode communication device. The method can further include the step of controlling the multiparty communication from the dual mode communication device by using a push-to-talk activation to invite additional parties on the second network to join the multiparty communication. The audio can maintain open and routed to both the second communication device and the third communication device when in the multiparty communication. The method can include the transmission of a push-to-talk audible indicator from the dual mode communication device to the second communication device on the first network. Communication between the second communication device on the first network and the third communication device on the second network can occur during a listening mode at the third communication device. The method can also interrupt the open audio by the third communication device to enable a user at the third communication device on the second network to communicate with users on the first network. The method can also comprise determining if the interconnect call is between two dual mode communication devices and initiating a group call session between at least the dual mode communication device and the second communication device on the first network and the third communication device on the second network and dropping the interconnect call once the group call session is established.

In a second embodiment of the present invention, a system for multiparty communication using at least one dual mode communication device can include a dual mode radio having at least a first modem for operation on a first network and a second modem for operation on a second network and a processor coupled to the dual mode radio. The dual mode radio can be programmed to establish an interconnect call on a first network between the dual mode radio and a second communication device, receive a request for a private call on a second network from a third communication device, and mix and route audio from the private call and the interconnect call at the dual mode radio when a multiparty call mode is selectively chosen. The dual mode radio can be a first modem operating on a CDMA network and a second modem operating on an iDEN network. Note, the dual mode radio can be programmed to mix a microphone input at the dual mode radio with audio generated from the interconnect call on the first network and route a mixed signal to the second modem. The dual mode radio can be further programmed to transmit the mixed signal from the second modem to at least the third communication device on the second network. The system can further include a dual mode radio programmed to mix incoming voice received over the air from the first modem with incoming voice received over the air from the second modem to form a mixed received signal and further route the mixed received signal to a speaker at the dual mode radio. The dual mode radio can still be further programmed to control the multiparty communication from the dual mode radio by using a push-to-talk activation to invite additional parties on the second network to join the multiparty communication. Note, the second communication device can be a second dual mode radio and the dual mode radio can be further programmed to determine if the interconnect call is between two dual mode radios and initiate a group call session between at least the dual mode radio and the second dual mode radio on the first network and the third communication device on the second network and dropping the interconnect call on the first network once the group call session is established.

In a third embodiment of the present invention, a dual mode radio used for three way calling with private mode can include a first transceiver for operation on a first network, a second transceiver for operation on a second network, and a processor coupled to the first transceiver and the second transceiver. The dual mode radio can be programmed to establish an interconnect call on a first network between the dual mode radio and a second communication device, receive a request for a private call on a second network from a third communication device; and mix and route audio from the private call and the interconnect call at the dual mode radio when a multiparty call mode is selectively chosen. Note, the dual mode radio can be a first modem operating on a CDMA, GSM, or EVDO network using an interconnect channel and a second modem operating on an iDEN, or CDMA, GSM, or EVDO network using a private call channel. The dual mode radio can be further programmed to mix a microphone input at the dual mode radio with audio generated from the interconnect call on the first network and route a mixed signal to the second transceiver.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Although the term "private call" is primarily used in the claims and elsewhere, it should be understood within the scope of the embodiments and interpretation of the claims to be interchangeable with a "push-to-talk" call or a "push-to-connect" (PTT), or a "push-to-activate" (PTx), or a "push-to-connect over cellular" (PoC) or any other similar connection or communication. Likewise, the use "interconnect call" should be understood within the scope of the possible embodiments and interpretation of the claims herein to be interchangeable with "cellular communication" or "cellular call" or other similar communications. Also note that "modem" and "transceiver" are also used interchangeably herein.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 3 is a state diagram illustrating the operation of a mobile device in accordance with an embodiment of the present invention.

FIG. 4 is a state diagram illustrating the operation of a mobile device during a 3 way call with private call in accordance with an embodiment of the present invention.

DETAILED DESCRIPTION OF THE DRAWINGS

Figure 1:
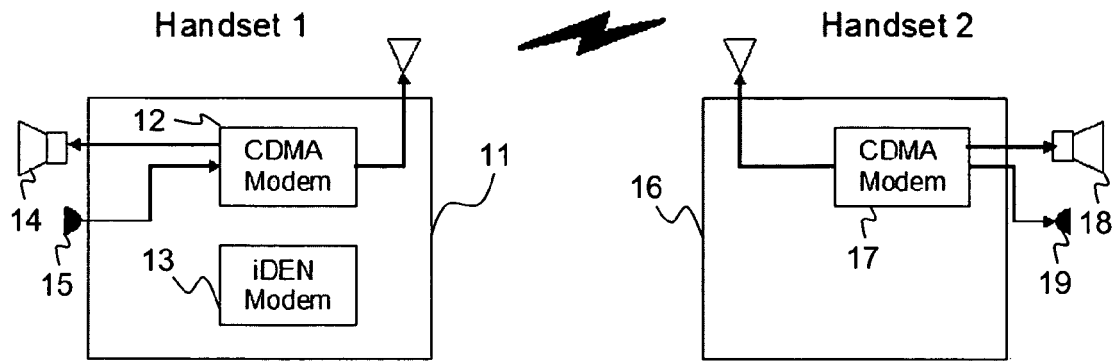
FIG. 1 is an illustration of an existing dual mode communication system.

While the specification concludes with claims defining the features of embodiments of the invention that are regarded as novel, it is believed that the invention will be better understood from a consideration of the following description in conjunction with the figures, in which like reference numerals are carried forward.

Embodiments herein can provide the ability of route a private call to an interconnect call and vice versa and provide for audio routing from Private call to Interconnect. Handling of PTT calls can be handled by the dual mode handset. In one embodiment, the dual mode handsets can switch to a selective dynamic group call (SDGC) from three-way calling.

Referring to FIG. 1, a communication system 10 is shown having a dual mode phone or radio 11 in communication with a single mode phone or radio 16. The dual mode radio 11 can include two transceivers or modems such as a CDMA modem 12 and an iDEN modem 13. A speaker 14 and a microphone 15 can be operatively coupled to the CDMA modem 12 to provide audible or acoustic outputs and inputs respectively. The single mode radio 16 can include a CDMA modem or transceiver 17 operatively coupled to a speaker 18 and microphone 19 as illustrated. On such a dual mode architecture when on a CDMA call, the dual mode radio 11 can have an iDEN modem that is idle and yet fully functional. The iDEN modem 13 can be used to make/receive an interconnect call or a private call.

Embodiments herein can integrate two different mode modems and enable mixing and routing between such modems to have a multi-party call. In the particular embodiment illustrated in FIG. 2, an iDEN modem 13 can be integrated with communication on the CDMA modem 12 while the CDMA modem is in use to have a full CDMA and Private Dispatch iDEN 3 way call across mode or networks (beside the already existing 3 way call that is supported individually by the iDEN and or CDMA infrastructures within a single network). When in a regular interconnect call, the dual mode handset can take the existing call on a preferred network. If the preferred network is CDMA, then the secondary modem (iDEN) is not used while on that call as represented by FIG. 1.

Figure 2:
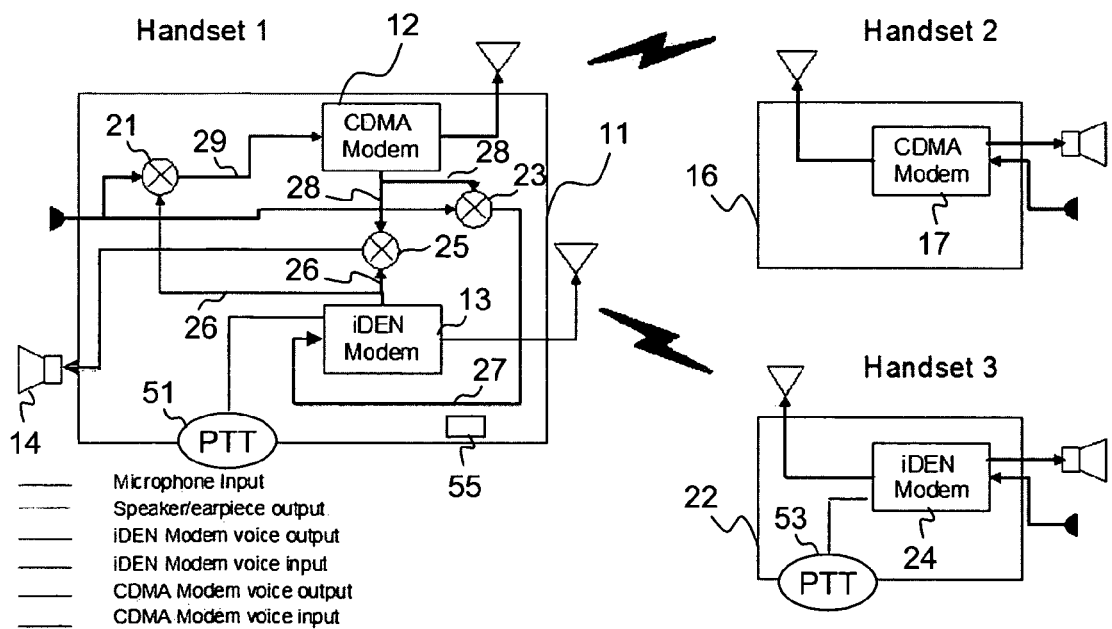
FIG. 2 is a block diagram of a dual mode system having an enhanced 3-way mode in accordance with an embodiment of the present invention.

During the CDMA interconnect call; if an iDEN private call is received, the modems can take the private call and integrate it with the existing CDMA call. When the iDEN private call is received, the iDEN modem 13 sends the signal to an Application Processor (AP processor) or other processor 55 and the AP processor informs the user of the incoming call. Once the call is announced, the user has several options including rejecting the call, taking the call and putting the CDMA call on Hold, or invite the new call to join the conversation. If the user decides to reject the call, the CDMA call is continued. The second option of taking the call switches the audio channel to the second mode, and puts the CDMA call on hold. On the third option, the audio of both calls (private and interconnect) are mixed and routed to the matching line. The system 20 of FIG. 2 shows how the audio is mixed and routed in a multiparty (or in this case, 3-way call).

With respect to the radio or phone 11, the microphone inputs are mixed with the CDMA incoming audio 28 using mixer 23 so it can be routed to the iDEN modem (as signal 27) and transmitted to a third mobile radio 22 (handset 3) having an iDEN modem 24. The microphone input is also mixed with the iDEN modem incoming audio 26 using mixer 21 and a mixed signal 29 is routed to the CDMA modem 12 to be transmitted to the mobile radio 16 (handset 2) having CDMA modem 17.

With respect to the speaker output of radio 11, the incoming voice from the CDMA modem 28 is mixed at mixer 25 with the incoming voice 26 of the iDEN modem. Both incoming voice signals are received over the air and routed to the (handset 1) speaker 14.

The private call on the iDEN modem 13 is a one-way call. The radio 11 (Handset 1) is in charge to control the one-way conversation using a PTT button 51. At radio 11 (Handset 1), when the user presses the PTT button 51 it invites radio 22

(handset 3) to join and the audio is "always" open and routed to the mobile radio 22 (Handset 3) as well as the mobile radio 16 (handset 2). Note, the PTT chirp can also be transmitted to the mobile radio 16. At mobile radio 16 (Handset 2), the user of the radio 16 does not have control on the private call conversation. The user of the radio 16 can listen to the conversation between the users of radio 11 (Handset 1) and radio 22 (handset 3). The user of handset 2 cannot initiate the call to the user of handset 3 (since radio 16 has no PTT button), but the user of radio 16 can talk to radio 22 (Handset 3) via Handset 1 when Handset 3 is in listen mode. The user of handset 2 or radio 16 has an idea of the control or when they can speak since he or she can listen to the chirp(s).

At mobile radio 22 (Handset 3), the user of the radio 11 (and radio 22) can listen to the conversation of the user of the handset 3 all the time since the conversation is always routed to the handset 3 when the handset 1 has invited it via PTT button selection. The "always on" mode can be interrupted by the user of the handset 3. When a PTT button 53 is pressed at the radio 22 (handset 3), the radio 22 can send an abort signal. The "always on" is then interrupted and now the user of the radio 22 or handset 3 can talk. The abort operation is seamless to users of handset 1 and 3 and is treated as a PTT call. The user of radio 16 or handset 2 also listens when the user of handset 3 is talking via the mixing and routing enabled at mobile radio 11. Upon termination of a PTT call from Handset 3 to Handset 1 (Handset 2 is connected to Handset 3 via Handset 1), Handset 3 is put into listen mode by Handset 1. Handset 3 can leave this 3 way call by completely exiting this mode.

Referring to FIG. 3, a state chart 30 illustrates the states that mobile radio 11 can progress through. The radio 11 can be in an idle state 31 and then enter a CDMA interconnect call state 32 by receiving an incoming or placing an outgoing CDMA call. A pending 3-way incoming state 33 can occur upon receiving a private call from a third party. The radio 11 can return to state 32 if the 3-way call is rejected. If the 3-way call is accepted, the radio 11 can either enter a 3 way mode state 34 or communicate on private call while the CDMA interconnect call is placed on hold at state 35. If the party on hold is invited to the three-way call, then the state progresses from state 35 to state 34. If the private call is terminated during state 35, then radio 11 returns to state 32 where the CDMA interconnect call continues. If the CDMA call is terminated during state 35, then the private call continues at state 36 until the private call is terminated and the radio 11 returns to the idle state 31. While in the 3-way mode state 34, the radio 11 can also return to the CDMA interconnect call state 32 if the private call is terminated.

Referring to state diagram 40 of FIG. 4, state 41 is an "always on" mode where handset 3 is in listen mode (always on) enabled by Handset 1 (serving as a 3 way controller). Handset 2 is in a listen/talk mode. State 42 is an abort mode. An abort message can be received by Handset 2 and a chirp can be sent to Handset 1. State 43 is a listening mode where Handset 1 accepts the abort. Handset 3 can initiate the private call and Handset 1 starts "listening mode" and routes the audio to Handset 2. State 44 is a switch mode. After the PTT is released, the handset 1 reconnects the handset 3 and goes back to "always on" mode.

Figure 5:
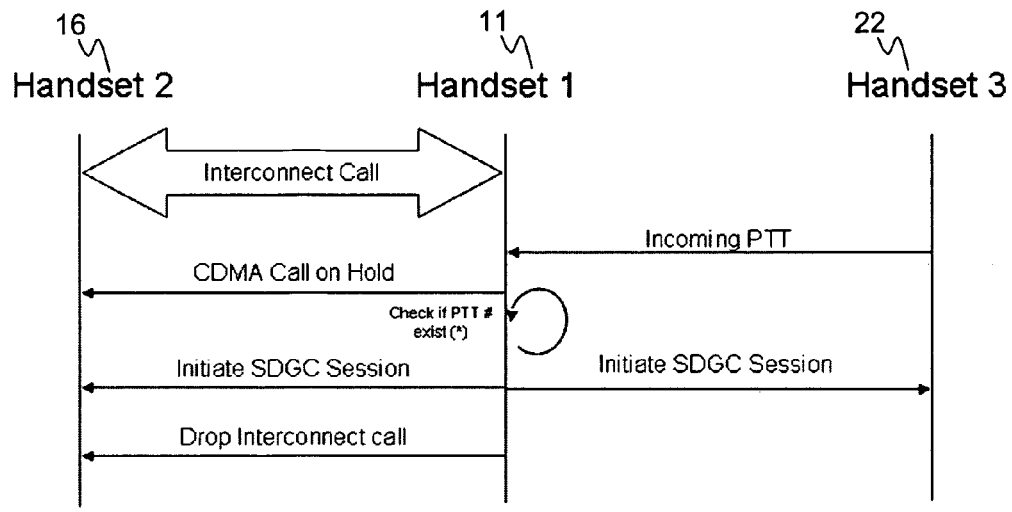
FIG. 5 is a timing diagram illustrating the operation of 3 mobile phones in accordance with an embodiment of the present invention.

Referring to FIG. 5, if the handset 2 or radio 16 is also a dual mode handset, and a similar situation is encountered as described above, then handset 1 or radio 11 can start automatically a selective dynamic group call (SDGC) at anytime after accepting the private call. When a PTT incoming call is received by the Handset 1, the steps as illustrated by the flow diagram 50 of FIG. 5 are performed. An incoming PTT call can be received by Handset 1. If the user of Handset 1 decides to create an SDGC call, then the Handset 1 puts a CDMA call on hold on call with Handset 2. Handset 1 then checks if Handset 2 has a PTT address (check on the phone book of Handset 1 to see if a PTT number for the Handset 2 exists.) If a PTT address does not exist in a phone book of Handset 1, the Handset 1 can request it using a data channel. The SDGC call can be Initiated with both handsets and the interconnect call with handset 2 can be dropped.

Figure 6:
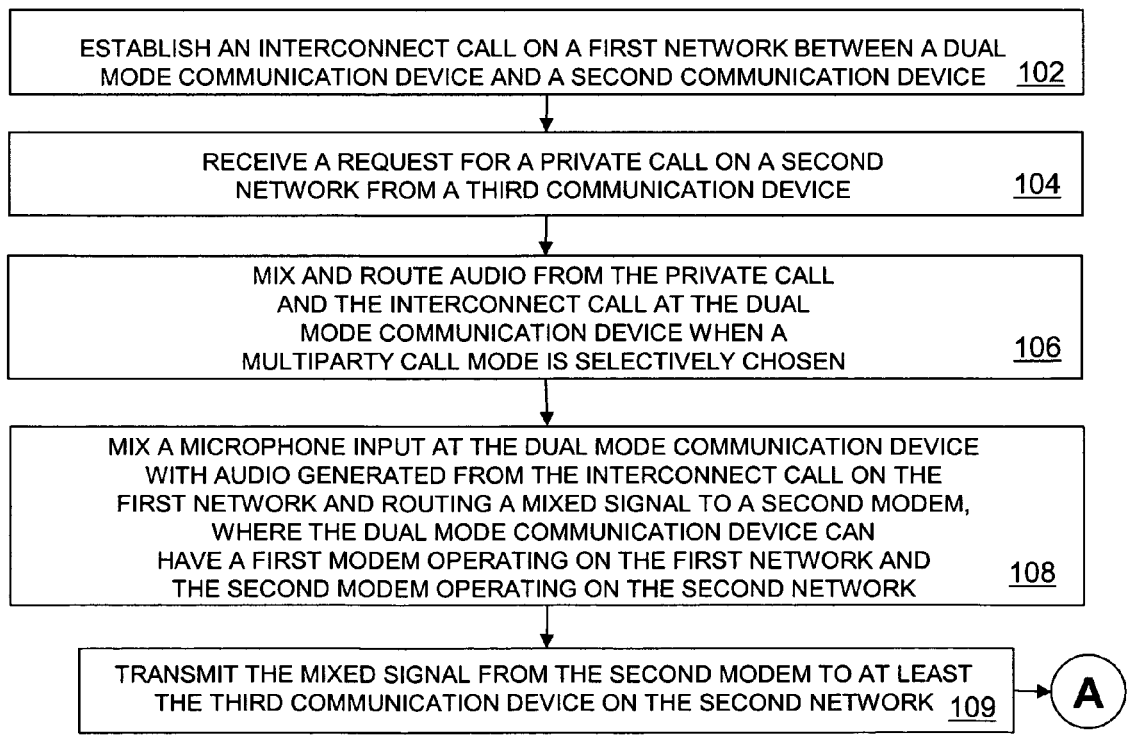
FIG. 6 is a flow chart illustrating a method of enhanced 3 way mode for PTT in accordance with an embodiment of the present invention.
Figure 7:
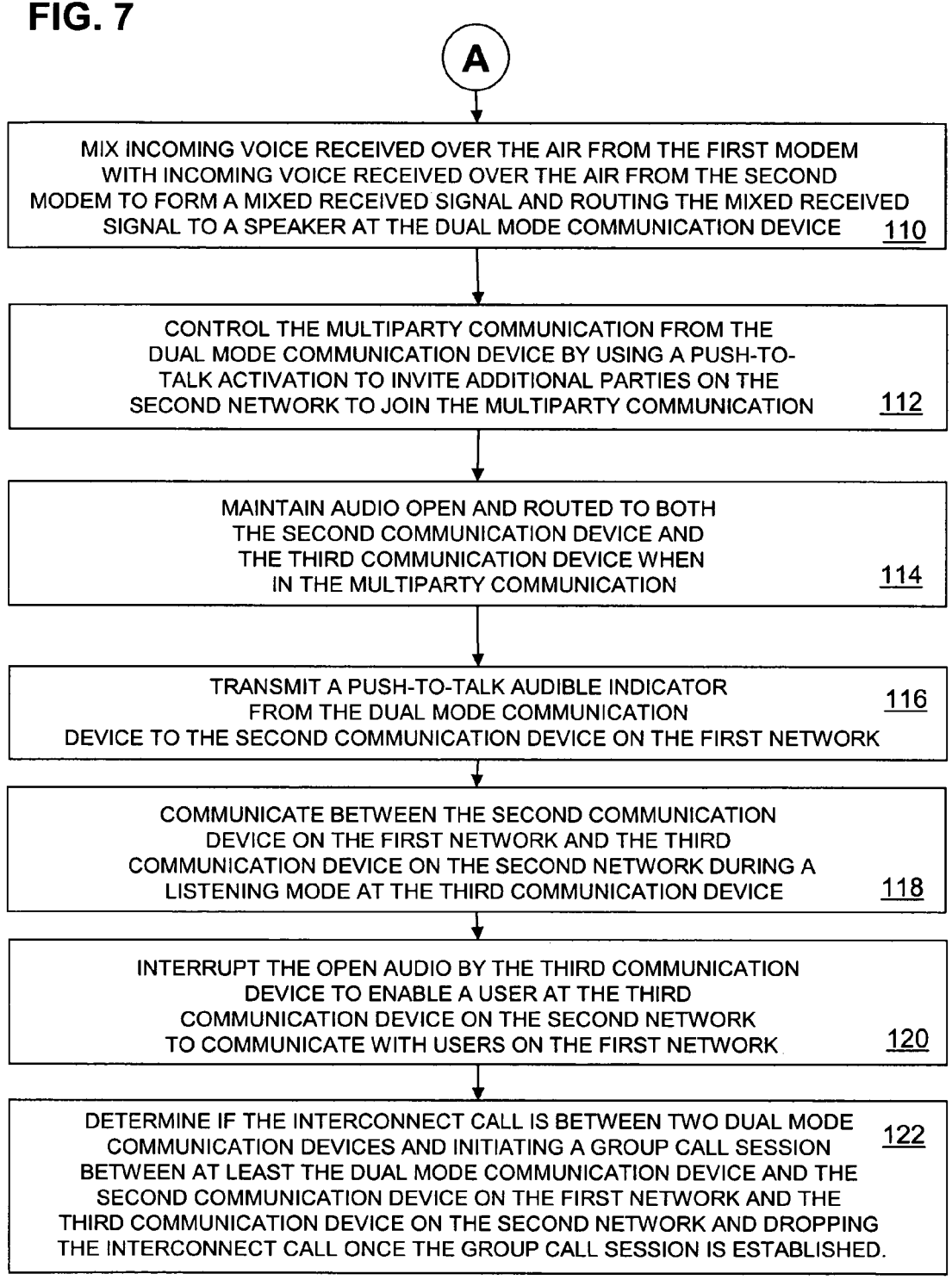
FIG. 7 is a continuation of the flow chart of FIG. 6 in accordance with inventive embodiments herein.

Referring to FIGS. 6 and 7, a method 100 for multi-party communication for push-to-talk on a dual mode communication device is illustrated. The method 100 can include the step 102 of establishing an interconnect call on a first network between the dual mode communication device and a second communication device, receiving a request for a private call on a second network from a third communication device at step 104, and mixing and routing audio from the private call and the interconnect call at the dual mode communication device when a multiparty call mode is selectively chosen at step 106. The dual mode communication device can have a first modem operating on the first network and a second modem operating on the second network and the method 100 can further include the step 108 of mixing a microphone input at the dual mode communication device with audio generated from the interconnect call on the first network and routing a mixed signal to the second modem. The method 100 can then transmit the mixed signal from the second modem to at least the third communication device on the second network at step 109.

Referring to FIG. 7, the method 100 can continue and further include mixing incoming voice received over the air from the first modem with incoming voice received over the air from the second modem to form a mixed received signal and routing the mixed received signal to a speaker at the dual mode communication device at step 110. The method can further include the step 112 of controlling the multiparty communication from the dual mode communication device by using a push-to-talk activation to invite additional parties on the second network to join the multiparty communication. The audio can maintain open and routed to both the second communication device and the third communication device when in the multiparty communication at step 114. The method can include at step 116 the transmission of a push-to-talk audible indicator from the dual mode communication device to the second communication device on the first network. Communication between the second communication device on the first network and the third communication device on the second network can occur during a listening mode at the third communication device at step 118. The method 100 at step 120 can also interrupt the open audio by the third communication device to enable a user at the third communication device on the second network to communicate with users on the first network. The method 100 can also comprise determining at step 122 if the interconnect call is between two dual mode communication devices and initiating a group call session between at least the dual mode communication device and the second communication device on the first network and the third communication device on the second network and dropping the interconnect call once the group call session is established.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method for multi-party communication for push-to-talk on a dual mode communication device, comprising the steps of:

establishing an interconnect call on a first network between the dual mode communication device and a second communication device;

receiving a request for a private call on a second network from a third communication device;

mixing and routing audio from the private call and the interconnect call at the dual mode communication device when a multiparty call mode is selectively chosen; and wherein the dual mode communication device has a first modem operating on the first network and a second modem operating on the second network and the method further comprises mixing a microphone input at the dual mode communication device with audio generated from the interconnect call on the first network and routing a mixed signal to the second modem.

2. The method of claim 1, wherein the method further comprises the step of transmitting the mixed signal from the second modem to at least the third communication device on the second network.

3. The method of claim 1, wherein the method further comprises mixing incoming voice received over the air from the first modem with incoming voice received over the air from the second modem to form a mixed received signal and routing the mixed received signal to a speaker at the dual mode communication device.

4. The method of claim 1, wherein the method further comprises the step of controlling the multiparty communication from the dual mode communication device by using a push-to-talk activation to invite additional parties on the second network to join the multiparty communication.

5. The method of claim 4, wherein the method further comprises the step of maintaining audio open and routed to both the second communication device and the third communication device when in the multiparty communication.

6. The method of claim 5, wherein the method further comprises the step of interrupting the open audio by the third communication device to enable a user at the third communication device on the second network to communicate with users on the first network.

7. The method of claim 1, wherein the method further comprises transmitting a push-to-talk audible indicator from the dual mode communication device to the second communication device on the first network.

8. The method of claim 1, wherein the method further comprises the step of communicating between the second communication device on the first network and the third communication device on the second network during a listening mode at the third communication device.

9. The method of claim 1, wherein the method further comprises the step of determining if the interconnect call is between two dual mode communication devices and initiating a group call session between at least the dual mode communication device and the second communication device on the first network and the third communication device on the second network and dropping the interconnect call once the group call session is established.

10. A system for multiparty communication using at least one dual mode communication device, comprising:

a dual mode radio having at least a first modem for operation on a first network and a second modem for operation on a second network; and a processor coupled to the dual mode radio, wherein the dual mode radio is programmed to:

establish an interconnect call on a first network between the dual mode radio and a second communication device;

receive a request for a private call on a second network from a third communication device;

mix and route audio from the private call and the interconnect call at the dual mode radio when a multiparty call mode is selectively chosen; and wherein the dual mode radio is further programmed to mix incoming voice received over the air from the first modem with incoming voice received over the air from the second modem to form a mixed received signal and further route the mixed received signal to a speaker at the dual mode radio.

11. The system of claim 10, wherein the dual mode radio comprises a first modem operating on a CDMA network and a second modem operating on an iDEN network.

12. The system of claim 10, wherein the dual mode radio is further programmed to mix a microphone input at the dual mode radio with audio generated from the interconnect call on the first network and route a mixed signal to the second modem.

13. The system of claim 12, wherein the dual mode radio is further programmed to transmit the mixed signal from the second modem to at least the third communication device on the second network.

14. The system of claim 10, wherein dual mode radio is further programmed to control the multiparty communication from the dual mode radio by using a push-to-talk activation to invite additional parties on the second network to join the multiparty communication.

15. The system of claim 10, wherein the second communication device is a second dual mode radio and the dual mode radio is further programmed to determine if the interconnect call is between two dual mode radios and initiate a group call session between at least the dual mode radio and the second dual mode radio on the first network and the third communication device on the second network and dropping the interconnect call once the group call session is established.

16. A dual mode radio used for three way calling with private mode, comprising:
- a first transceiver for operation on a first network;
- a second transceiver for operation on a second network; and
- a processor coupled to the first transceiver and the second transceiver, wherein the dual mode radio is programmed to:
  - establish an interconnect call on a first network between the dual mode radio and a second communication device;
  - receive a request for a private call on a second network from a third communication device;
  - mix and route audio from the private call and the interconnect call at the dual mode radio when a multiparty call mode is selectively chosen; and wherein the dual mode radio has a first modem operating on the first network and a second modem operating on the second network; mixing a microphone input at the dual mode radio with audio generated from the interconnect call on the first network and routing a mixed signal to the second modem.

17. The dual mode radio of claim 16, wherein the dual mode radio comprises a first modem operating on a CDMA, GSM, EVDO network using an interconnect channel and a second modem operating on an iDEN, or CDMA, GSM, EVDO network using a private call channel.

* * * * *